US005964407A

United States Patent [19]

Sandkleiva

[11] Patent Number: 5,964,407

[45] Date of Patent: Oct. 12, 1999

[54] PAINTING ROBOT WITH A PAINT SUPPLY SYSTEM

[75] Inventor: Are Sandkleiva, Kvernaland, Norway

[73] Assignee: ABB Flexible Automation A/S, Bryne, Norway

[21] Appl. No.: 08/981,235

[22] PCT Filed: May 15, 1996

[86] PCT No.: PCT/IB96/00453

§ 371 Date: Apr. 23, 1998

§ 102(e) Date: Apr. 23, 1998

[87] PCT Pub. No.: WO97/00731

PCT Pub. Date: Jan. 9, 1997

[30] Foreign Application Priority Data

Jun. 22, 1995 [SE] Sweden .................................. 9502271

[51] Int. Cl.[6] ........................... B05B 15/02; B05B 12/14; B05B 7/04; B25J 11/00

[52] U.S. Cl. .............. 239/112; 239/416.1; 239/DIG. 14; 901/43

[58] Field of Search ............................ 239/112, 302–305, 239/587.2, 588, 413, 416.1; 901/43

[56] References Cited

U.S. PATENT DOCUMENTS 4,785,760 11/1988 Tholome ................................ 118/323
4,944,459 7/1990 Watanabe et al. ....................... 239/305
5,029,755 7/1991 Schmidt et al. ............................ 239/1
5,521,477 5/1996 Sasaki .................................. 901/43 X
5,735,627 4/1998 Nagao et al. ......................... 901/43 X

FOREIGN PATENT DOCUMENTS 2 149 323 6/1985 United Kingdom .

*Primary Examiner*—Lesley D. Morris
*Attorney, Agent, or Firm*—Pollock, Vande Sande & Amernick

[57] ABSTRACT

A paint supply system for a painting robot, the system includes a paint spraying device mounted on a tool holder at the outer end of a robot arm and having an adapter unit for mounting on the robot arm close to or in direct contact with the paint spraying device, first and second supply lines for supplying first and second painting fluids to the adapter, and a third supply line for supplying a cleansing fluid to the adapter. The adapter includes a first inlet duct connected to the first supply line, a second inlet duct connected to the second supply line, a third inlet duct connected to the third supply line, an outlet duct connected to the paint spraying device, first valve means for connecting the first inlet duct to the outlet duct, second valve means for connecting the second inlet duct to the outlet duct, and third valve means for connecting the third inlet duct to the outlet duct.

9 Claims, 3 Drawing Sheets

PAINTING ROBOT WITH A PAINT SUPPLY SYSTEM

TECHNICAL FIELD

The invention relates to painting robots equipped for change between different colours or the use of two-component paints.

BACKGROUND OF THE INVENTION

For many applications of painting robots it is desirable to be able to change color quickly, e.g. in automobile painting.

During color change, the supply volume between a colour changing equipment and the paint spraying device has to be emptied of the previously used paint and thoroughly cleaned with a cleaning liquid before new paint can be supplied. This volume is mostly made up by the supply lines between the changing equipment and the spraying device.

In other applications of painting robots, two-component paints are used. These components have to be mixed immediately before application. After finishing a paint application cycle, the supply volume filled with mixed paint has to be quickly emptied and thoroughly cleaned with cleansing liquid. Fast reacting two-component paints may already have started to cure during the preparation for cleaning thereby making cleaning more difficult.

FIG. 1 shows a painting robot of the prior art. The color changing equipment or the two-component mixing equipment is placed at the lower part of the robot in order to ensure short supply distances without having the color changer etc. interfering with the operational precision of the robot arm.

For both color change and two-component applications, the large volumes of waste paint that accumulate constitute a problem due to their environmental impact and the cost of the waste paint.

SUMMARY OF THE INVENTION

The present invention improves upon conventional painting robots with colour changing equipment by having a paint supply system comprising an adapter with an integrated color changing unit placed on the robot arm, close to or in direct contact with the paint spraying device, thereby minimizing the supply volume that needs to be discharged and cleaned between color changes. In the same way a mixing unit is integrated into an adapter for application of two-component paints.

The adapter is made by a lightweight material such as a polymeric material or a light metal.

The color changing unit of the adapter comprises two paint supply lines, each carrying paint of different color. In the same way, two-component paint is supplied in two lines, one line for each component to a mixing unit.

The combination of the compact design of the color or mixing unit with the light material enables the adapter to be placed at the outer end of the robot arm, without interfering with the movements of the robot arm or disturbing the operational precision of the arm.

The adapter can also be used for speeding up color change between many colors by using one of the supply lines for applying paint and simultaneously preparing the other supply line for the next color by flushing it with cleansing liquid and filling it with the next paint to be used. Then a fast color change can be performed by switching to the other supply line for applying paint and perform the rinsing operation on the first supply line.

It is possible to integrate more than one color or mixing units in parallel into the adapter for use with two or more paint spraying devices. This is useful for applications where different kinds of paints are to be applied, enabling a fast shift between the use of different colors.

DETAILED DESCRIPTION OF THE PREFERRED EMBODIMENT

Figure 1:
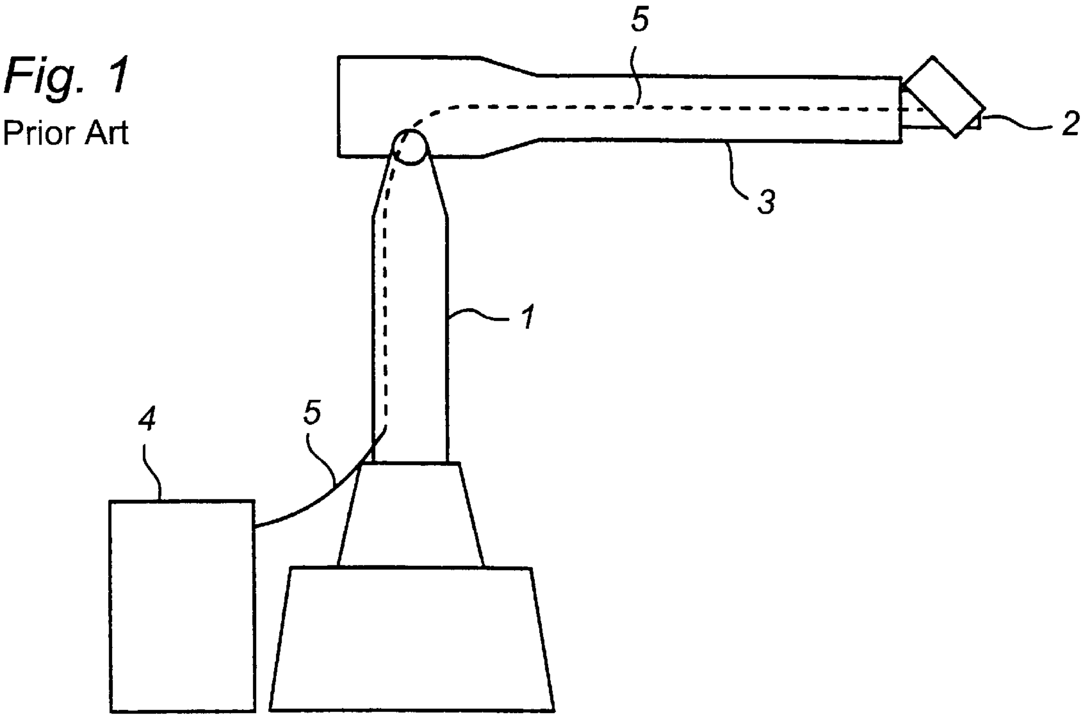
Fig. 1 Prior Art
FIG. 1 shows a prior art painting robot.

FIG. 1 shows a painting robot 1 of the prior art with color changing equipment or two-component mixing equipment 4 placed at the lower part of the robot 1. The paint spraying device 2 is held by a tool holder at the end of the robot arm 3. The supply line 5 is used for connecting the paint spray device 2 with the color changing equipment 4. The volume of the supply line constitutes essentially the paint volume that needs to be discarded after each painting cycle.

Figure 2:
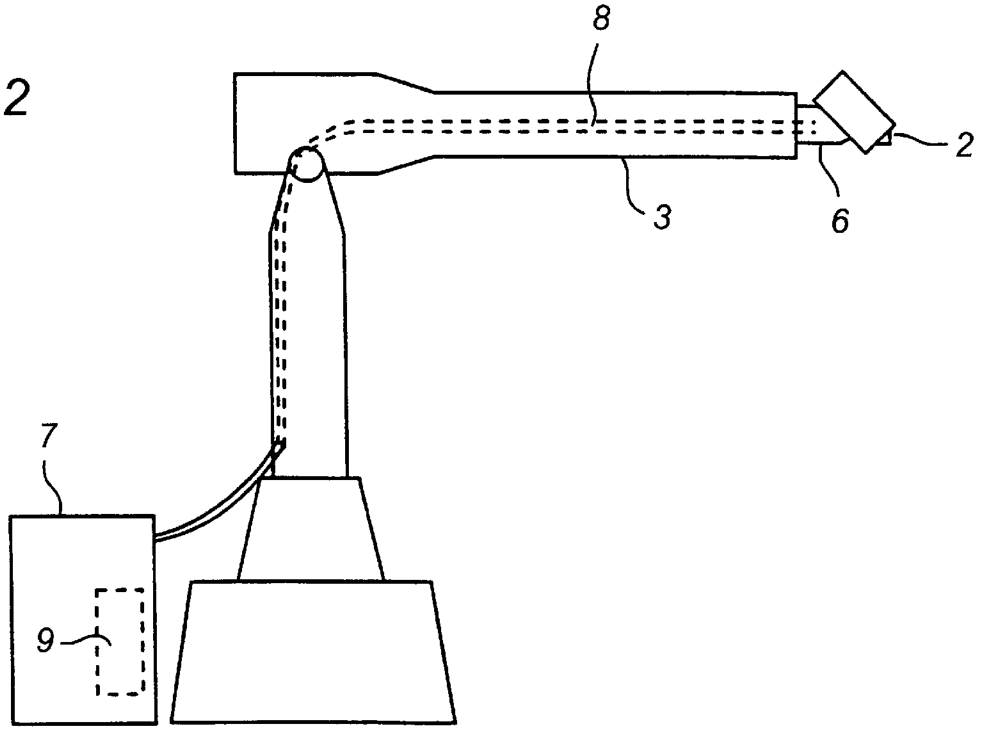
FIG. 2 shows a schematic view of a painting robot according to the present invention.

FIG. 2 shows an adapter 6 with a color changing or mixing unit, placed at the end of the robot arm 3 in direct contact with the paint spraying device 2. The adapter 6 is connected to a color reservoir 7 placed at the lower part of the robot by a pair of supply lines 8. It is only the paint content inside the adapter that has to be discarded after a painting cycle. The color reservoir 7 may also contain a multicolor changer 9.

The other lines for pressurized air, solvent, dumped paint etc. are omitted in FIGS. 1 and 2.

Figure 3:
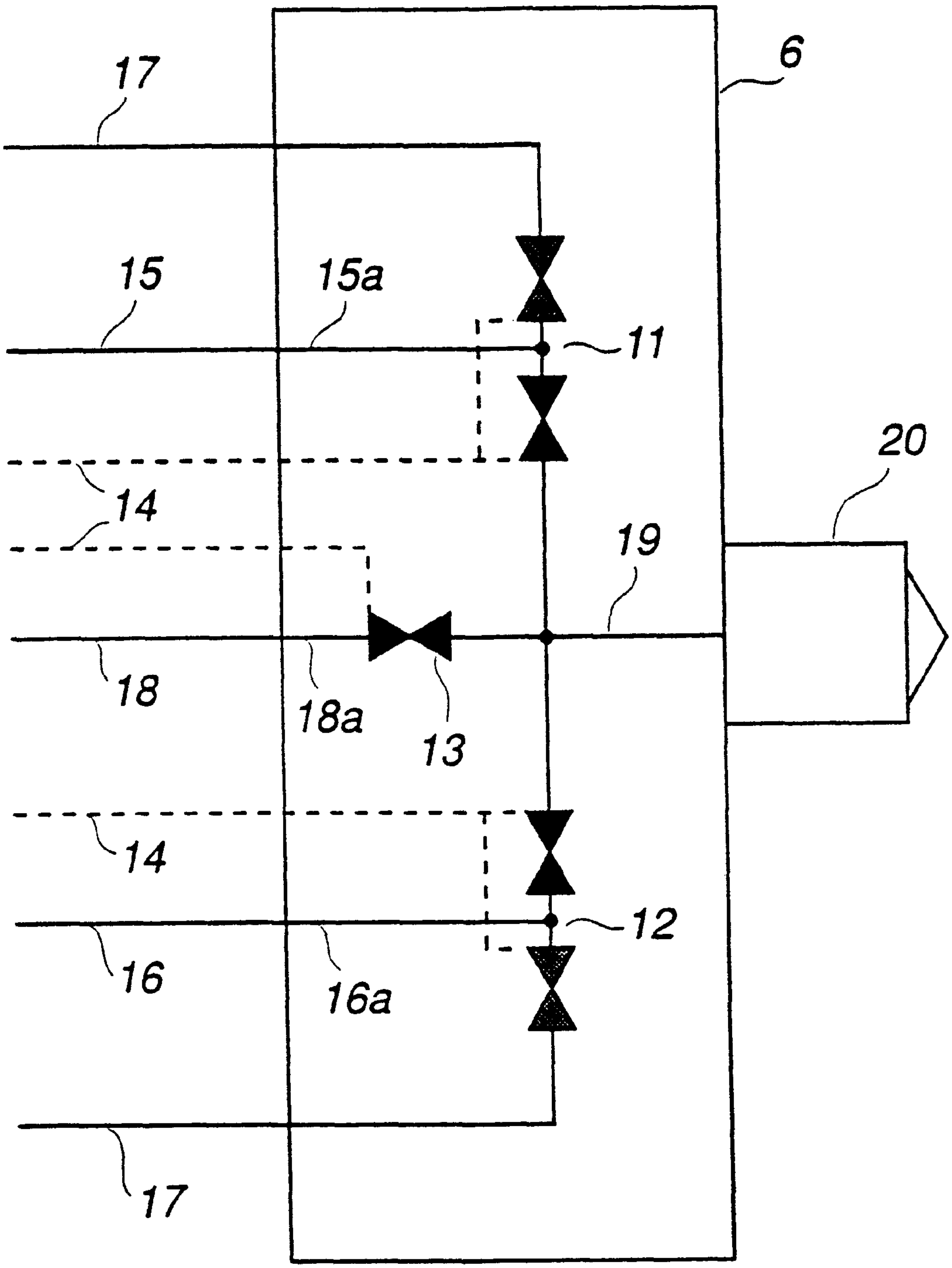
FIG. 3 shows a schematic drawing of an adapter with a color changing unit.

FIG. 3 shows the principal design of the adapter 6 with an integrated color changing unit. There are two double-acting valves 11 and 12, one single-acting valve 13, pilot lines 14 for pressurized air for actuating the valves, supply line 15 and an inlet duct 15*a* for paint I, supply line 16 and inlet duct 16*a* for paint II, dump line 17 and solvent/air supply line 18 and inlet duct 18*a*. The adapter 6 is connected to the paint spraying device 2 by the outlet duct 19. When a painting cycle using paint I is finished, valve 11 closes the connection between the spraying device 2 and the paint supply line 15. Valve 13 is opened for cleaning of the paint spraying device 2 with solvent and air supplied through line 18. After closing valve 13, paint II can be supplied to the spraying device 2 through valve 12. If more than two colors are used, the non-used supply line can be cleaned by the double-acting valves 11 and 12 allowing solvent and air to pass through the non-used supply line for cleaning and discharging the solvent through line 17. After cleaning, the non-used supply line can be loaded with another color during operation of the other supply line. For example, the supply line 15 for paint I can be cleaned and subsequently loaded with a new paint III during application of paint II through the other supply line 16. Thus, a change between more than two colors can be performed with the same short interruption time as for a change between two colors by combining two paint changing units integrated into the adapter with a multicolor changer 9 in the supply unit 7 at the lower part of the robot.

Figure 4:
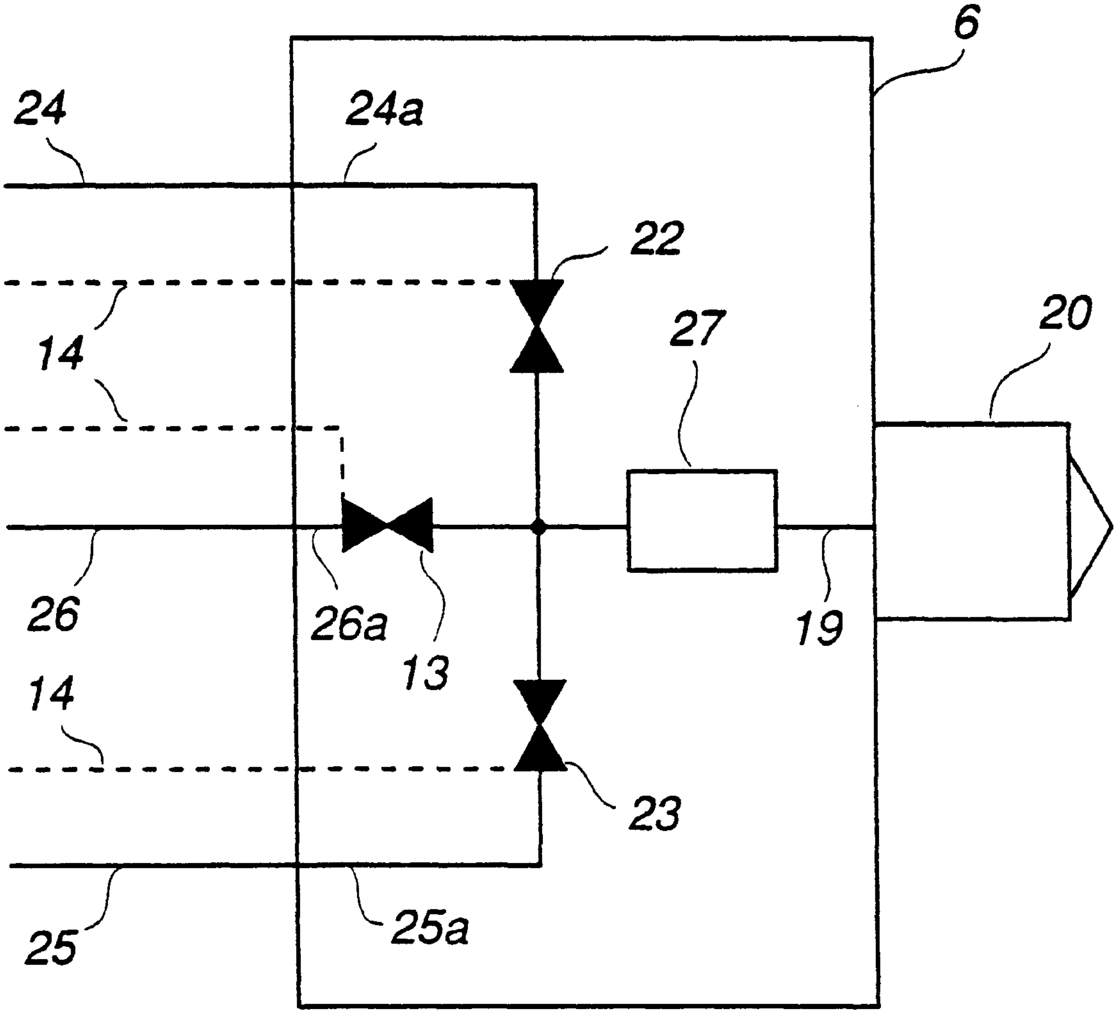
FIG. 4 shows a schematic drawing of an adapter with a mixing unit.

FIG. 4 shows the fundamental design and the mode of operation of the adapter 6 with an integrated mixing unit. It includes three single-acting valves 22,23 and 13, a supply line 24 and inlet duct 24*a* for component I, a supply line 25 and inlet duct 25*a* for component II, a supply line 26 and inlet duct 26*a* for air and solvent, and a static mixer 27. The valves are actuated by pressurized air supplied by pilot lines 14. The paint spraying device 20 is connected to the adapter by the outlet duct 19. During paint application, valves 22 and 23 are both open, the components are mixed in the mixer and flow to the spraying device. After finished paint application, valves 22 and 23 are closed, valve 13 is opened for cleaning of the mixer and the paint spraying device with solvent and air.

I claim:

1. A paint supply system for a painting robot, said system comprising a paint spraying device mounted on a tool holder on the outer end of a robot arm and including:

an adapter unit for mounting on the robot arm close to or in direct contact with the paint spraying device, first and second supply lines for supplying first and second painting fluids to the adapter, a third supply line for supplying a cleansing fluid to the adapter, wherein the adapter includes a first inlet duct connected to the first supply line, a second inlet duct connected to the second supply line, a third inlet duct connected to the third supply line, an outlet duct connected to the paint spraying device, first valve means for connecting the first inlet duct to the outlet duct, second valve means for connecting the second inlet duct to the outlet duct, third valve means for connecting the third inlet duct to the outlet duct.

2. A paint supply system according to claim 1 wherein the first and second painting fluids are components of a two-component paint, and the system comprises means for either during a paint spraying operation, maintaining said third valve means closed and said first and second valve means open for supplying the two-paint components to the spray gun, or for cleansing the adapter and spray gun, maintaining said first and second valve means closed and said third valve means open.

3. A paint supply system according to claim 2, wherein the adapter outlet duct comprises a mixing unit for mixing the two-paint components.

4. A paint supply system according to claim 1 wherein the first and second painting fluids are first and second single-component paints, and the system comprises means for either during a paint spraying operation with said first paint, maintaining said second and third valve means closed and said first valve means open for supplying said first paint to the spray gun, or during a paint spraying operation with said second paint, maintaining said first and third valve means closed and said second valve means open for supplying said second paint to the spray gun, or for cleansing the adapter and spray gun maintaining said first and second valve means closed and said third valve means open.

5. A paint supply system according to claim 4, wherein said first and second valve means are double-acting valves for selectively connecting each of the first and second inlet ducts either to the outlet duct or to a dump line.

6. A paint supply system according to claim 4, further comprising it comprises a multi-color changer for supplying paint through said first and second supply lines to the adapter.

7. A paint supply system according to claim 1, wherein the adapter is a monolithic block of polymeric light matrial.

8. A paint supply system according to claim 1, wherein the adapter is a monolithic block of light metal.

9. A paint supply system according to claim 1, wherein said first, second and third valve are actuated by pressurized air.

* * * * *